March 13, 1928.

R. M. WEEKS 1,662,352

ROUTE INDICATOR FOR PROPELLED VEHICLES

Filed Jan. 5, 1924

March 13, 1928. 1,662,352
R. M. WEEKS
ROUTE INDICATOR FOR PROPELLED VEHICLES
Filed Jan. 5, 1924 2 Sheets-Sheet 2
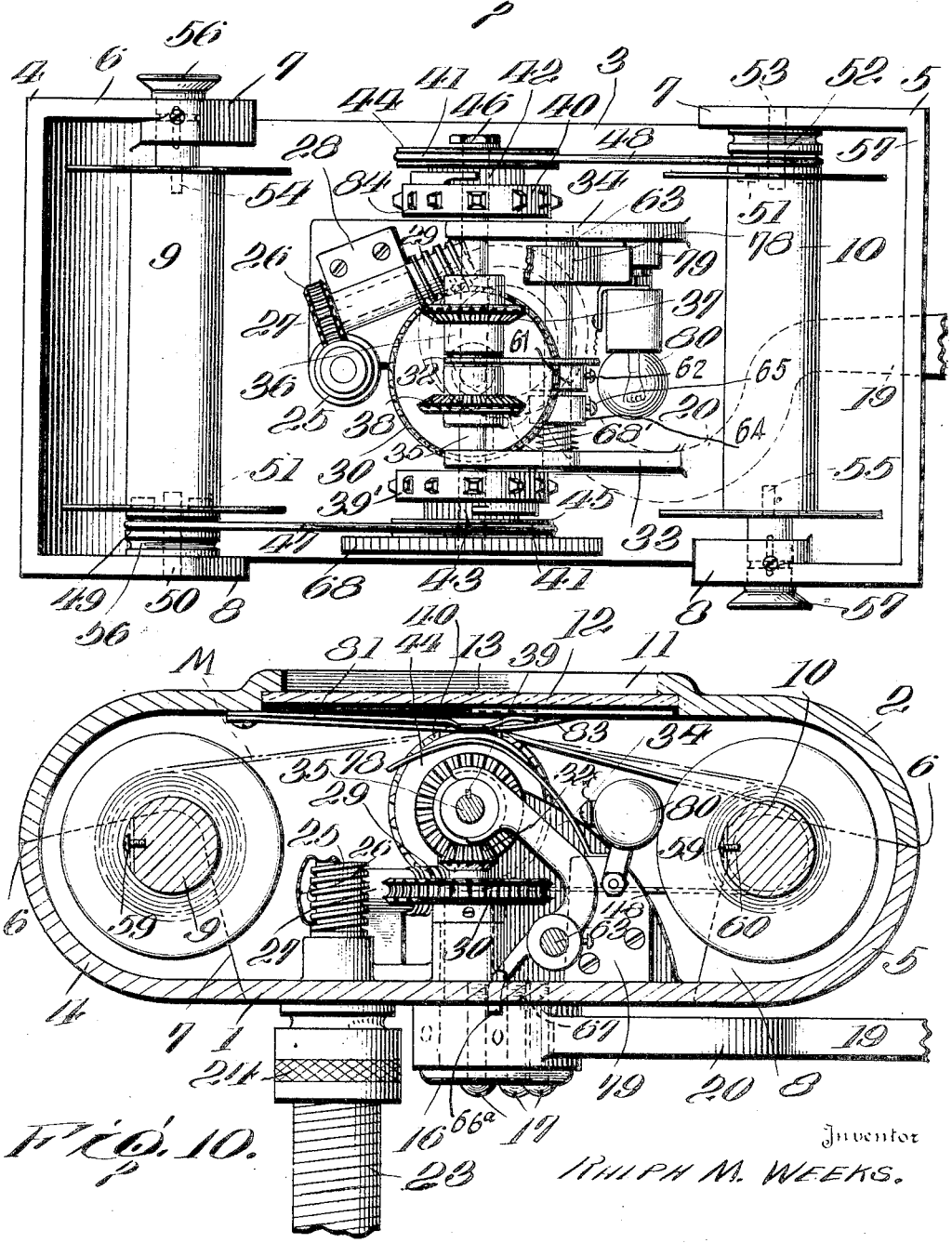

Patented Mar. 13, 1928.

1,662,352

UNITED STATES PATENT OFFICE.

RALPH M. WEEKS, OF GROTON, CONNECTICUT.

ROUTE INDICATOR FOR PROPELLED VEHICLES.

Application filed January 5, 1924. Serial No. 684,582.

This invention relates to a route or guide map for propelled vehicles to enable the driver of the vehicle to find his way with certainty and with safety along the prescribed route.

The invention is capable of use in connection with any type of propelled vehicle, such as an automobile, aircraft, motivated boat, or the like.

For the sake of illustration and description, the invention is set forth as applied specifically to a road map for an automobile.

One of the objects of the present invention is to provide a compact and commercially usable road map comprising a casing in easy view of the driver, in which casing the road map is propelled in synchronism with the rate of travel of the automobile along the road, and which map is provided with route indicia or symbols corresponding to identifying landmarks on the road or along the roadside, and with signal mechanism operated by the map at designated times corresponding to signal operating means on the map so as to apprise the driver of the proximity of dangerous curves, crossings or the like.

One of the features of the present invention resides in the provision of means whereby the map can be reversely used in its casing without dismounting the spools upon which the map winds, and in the disposition of the route symbols or indicia on the map so that they will accord with the location of corresponding landmarks with regard to the right and left sides of the road, irrespective of the direction of travel of the vehicle. For instance, if an automobile be traveling along the road in one direction, certain route indicia on the right side of the propelled map will correspond with landmarks on the right side of the road, and when the automobile is traveling along the same road in the opposite direction, those same indicia corresponding to such landmarks will remain on the same side of the map as they are on the road whereby identification of the surroundings is made more simple to the user of the road map.

Still another feature of the invention resides in the means for reversing the casing of the road map relatively to the vehicle on which it is mounted and in the means whereby the reversal of such casing operates to automatically reverse the drive for propelling the map.

Still a further feature of the invention resides in the shiftable mounting of the casing and the means whereby when such casing is shifted to a neutral position, it will automatically disconnect the power drive for propelling the road map, so that the map can be adjusted by hand for purposes of calibrating the same.

Still another object of the invention resides in this arrangement of casing and map propelling means, together with the special arrangement of route symbols and indicia and printed words on the map so that such printed words may be easily and quickly read irrespective of the direction of travel of the map, and particularly with regard to the arrangement of the printed words on the map, whereby such words will be in correct reading position when the casing is swung to horizontal, which is the neutral hand adjusting position.

Yet a further feature of the invention resides in the compact arrangement of the road map with particular reference to the minimum number of parts, their simplicity in assembly, and their accessibility with reference to the enclosing casing, and further, the practical absence of the usual numerous controls for operating the map propelling mechanism.

Still a further feature of the invention resides in the novel arrangement of means for frictionally driving one or the other of the map spools according to the desired direction of propulsion of the map, and in the means for synchronizing the rate of feed of the map to correspond with the rate of travel of the vehicle over the road.

Yet another advantageous feature of the invention resides in the manner of driving either of the map spools from an intermediate power shaft, together with the means for disconnecting such power drive so that the spools may be manually operated to adjust the position of the map.

Yet a further feature of the invention resides in the specific construction of the reversible map whereby it is especially adaptable for use with a mechanism such as described in the present application.

These and other objects of the invention will be apparent from a perusal of the following specification when taken in connection with the accompanying drawings, wherein—

Figure 1 is a side view of the invention embodying a road map as applied to an automobile, and showing the road map attached to the steering post of the driving wheel in such position that the operator can look down through the wheel and see the map in operation;

Fig. 2 is a diagrammatic view of the position of the casing when the map is being propelled as the automobile travels along the road in one direction;

Fig. 3 is a corresponding view of the casing when it is shifted to horizontal position, at which time the power drive is disconnected;

Fig. 4 is a view similar to Fig. 2, in which arrangement the automobile is traveling in the opposite direction to Fig. 2, and the map casing shifted accordingly;

Figures 5, 6 and 7 are diagrammatic views illustrating the manner in which the location of the indicia on the road map will correspond exactly to the location of the indicia on the roadside, irrespective of the direction of travel of the map;

Fig. 8 is a section of the road map itself;

Fig. 9 is a top plan view of the road map casing and the propelling mechanism therein, the cover of the road map being removed;

Fig. 10 is a side sectional view of the road map casing, and its interior propelling mechanism, and Fig. 11 is a rather diagrammatic view of the relation of the power drive shaft and the eccentric bracket on which the casing is mounted.

In general, it is highly desirable that a road map shall be compact, easily operated, and shall be as free as possible from bothersome controls for the map propelling mechanism, and shall be capable of running in substantially perfect synchronism with the travel of the automobile along the road, so that the route symbols on the map will always accord in timed relation with their corresponding landmarks along the roadside. Inasmuch as the automobile is travelling at times at a high rate of speed, it is also highly desirable that the map should be read with great facility and speed and should be as simple as possible. To this end, it has been found necessary to provide a map which will always travel toward the driver just as the road does with relation to the vehicle, so that the route indicia on the map will come to the driver as the landscape does. It has been further found necessary to provide a reversible map so that when the direction of travel of the automobile is reversed, the travel of the map can likewise be reversed to enable the automobile driver to use the map in the reverse direction as he travels along the road in the reverse direction. To this end, a simple means has been provided for reversing the map without dismounting the map spools from the casing.

Referring now to the drawings in detail, the device comprises a casing or support comprising a bottom section 1 and a top section 2. To facilitate easy access to the interior of the casing, the lower section is entirely cut away at each side as the portions 3, (see Fig. 1). The two ends 4 and 5 extend half way up as at 6 and are provided on each side with sector-shaped walls 7 and 8 to support the map receiving spools 9 and 10 which are thus mounted at opposite ends of the casing. The cover 2 is shaped to form the closed oblong box-like casing which fits to the bottom as a snap connection. Thus, by a decided pull, the cover can be quickly removed from the casing to expose the interior mechanism. The cover at the top is provided with a sight hole 11 of ample proportions, and this is closed by a glass 12 provided with a centrally disposed transversely arranged hair line 13.

The casing is adapted to be mounted at any suitable point on the propelled vehicle in convenient view of the operator. In Fig 1, it is shown as mounted on the steering post 14 of an automobile, in such a position that the driver looking down through the wheel 15, can watch the glass covered opening 11.

In the construction illustrated, the bottom of the casing 1 is provided with a depending boss 16 secured thereto by three screws 17, which boss forms a pivotal bearing for a surrounding bracket 18 having a central hole fitting over the boss. This portion of the bracket is formed eccentric as at 18 for a purpose hereinafter set forth. The bracket 19 is provided with an extension curved outwardly as at 20 so as not to interfere with drive shaft connection 21. The extension 19 is secured by the clasp 22 to the steering post 14.

The spools 9 and 10 in the casing are adapted to be positively driven in order to propel the map which is wound on such spools. The map is wound onto one spool from the other, or vice versa, as desired. The source of driving power may be such as desired. In the adaptation of the invention to the guidance of automobiles, the driving power is taken preferably from the flexible speedometer shaft 23 which couples to a short shaft 24 projecting through the base 1 of the casing. Within the casing this shaft 24 terminates in an upstanding worm 25 which meshes with a worm gear 26 on a horizontal shaft 27 carried in a bearing 28 secured to the casing. The opposite end of shaft 24 is formed with a worm 29 which in turn meshes with a large worm gear 30. Gear 30 is horizontally secured to a vertical shaft 31 which stands up in the middle of the base 1. The extreme upper end of shaft 31 is provided with a horizontally disposed bevel gear 32.

Suitable brackets 33 and 34 are cast integral with the inner wall of the base of the casing 1. These brackets form bearings for a horizontal shaft 35 located just above bevel gear 32.

A reversing gearing unit is slidably mounted on this shaft 35. This reversing gearing comprises the sleeve 36 provided with the opposed bevel gears 37 and 38. The sleeve and gears are splined as at 39 on shaft 35 so that the gears can be slid back and forth to bring either into mesh with the central horizontal bevel gear 32 whereby to reverse the direction of rotation of shaft 35.

This shaft 35 is provided on each side of the bevel gears 37 and 38 with sprocket wheels 39' and 40 which are adapted to be positively driven by the shaft. These sprocket wheels control the rate of feed of the map and to this end, are provided with teeth adapted to fit into the spaced perforations on the map strip. The outside face of each sprocket wheel is provided with a pawl 41 which engages with the peripheral ratchet teeth 42 and 43 projecting from the side of each pulley 44 and 45 mounted loosely on shaft 35. The ratchet pawls and teeth are reversely arranged so that when pawl 41 is driving pulley 44 through the ratchet teeth 42, the pawl 41 is idly overrunning teeth 43 and pulley 45 is stationary. Any other type of overrunning clutch may be used.

Shaft 35 is provided with a nut 46 on one end to permit the endwise removal of the shaft when it is desired to dismantle the gears and pulleys. This construction is of great benefit in assembly.

Pulleys 44 and 45 are each provided with suitable grooves to receive the driving bands 47 and 48, each running to a pulley for driving a spool. For instance, pulley 45 is provided with a driving band 47 to drive a pulley 49 which rotates on a shaft 50 having its permanent bearing in the lateral sector 8 of the casing bottom 1. The inner face of this pulley is provided with clutch teeth, shown in dotted lines as 51 which fit with cooperative teeth on the side of the map spool 9 whereby positive driving torque is communicated from pulley 49 to spool 9. A similar construction affords means for driving map spool 10 from pulley 52 through driving band 48. The tension of the driving bands is selected so that each map spool will be driven positively, but will permit the belt to slip when the speed of travel of the map is restrained by the sprocket wheels 39 and 40.

The foregoing construction provides a very efficient compensating drive to provide for the gradually increasing diameter, of the map as it winds upon the map receiving spools. For instance, if the map is winding upon spool 10, it will be apparent that through the flexible band drive the pulley 10 is being driven two revolutions for every one revolution of pulley 44, and the map is coiled from spool 9 onto spool 10. At the outset, the driving relation is in accord with the peripheral speed of the sprocket teeth on sprocket wheels 39' and 40. But, as the diameter of the spool 10 increases, due to the winding of the map thereon, pulley 10 is still trying to rotate twice as fast as pulley 44 and the map is being fed from sprockets 39' and 40 to spool 10. Now, the increased circumference of spool 10 is attempting to pull more map from sprockets 39' and 40, but since the speed of the latter is constant relatively to the peripheral speed of the spools (although the speed of the sprockets varies with the rate of travel of the propelled vehicle) the map is held and in turn holds speed 10 which results in the slippage of the belt 48. The same operation takes place on the reverse drive through belt 47.

In order to provide a quick dismounting of the map spools 9 and 10, they are held in place by two pins; first the fixed pins 50 and 53 and the snap pins 54 and 55. These snap pins are so designed as to be readily pulled out of the spools 9 and 10 and may be held inwardly by the usual spring or may be held in a set position by friction fit. In either construction, when the head 56 or 57 is pulled out, the corresponding pin 54 or 55 is withdrawn from its map spool to permit removal of the spool. It is noted that the other end of the spool by means of the clutch teeth forms a disengageable driving connection. If desired, pulleys 9 and 10 may be provided with grooves 56 and 57 adapted to receive the end of a leaf spring having an anchorage in the casing 1 so as to stop idle rotation of the spool. Such a spring constitutes a brake. It should be mentioned in passing that each spool is provided with a pin 59 over which loops an eye 60 on the end of each map so that the map can be detached from its spool at either end. The map is shown at M and the sprocket holes preferably arranged along the lateral edges of the map strip are disclosed at S. These holes in cooperation with the power driven sprockets regulate the rate of travel of the map to correspond with the rate of travel of the propelled vehicle; if an automobile, its rate of travel along the road.

The means for reversing the drive of the sprocket shaft 35 is arranged to extend outside of the casing and in the present embodiment of the invention, a novel manner of operating this reversing means is provided, although manifestly, other controls are within the contemplation of the invention. In the arrangement illustrated, the sleeve 36 cooperates with a lateral arm 60 which in turn is rigid with a collar 61 fastened by means of a screw 62 on an endwise shiftable rod 63 having its bearings in the brackets 33 and 34. A second collar 64 is likewise fastened by a screw 65 to this rod. This collar 64 is provided with a depending toe 66ª which extends through a slot 67 in the bottom of the casing 1 (see dotted lines in Fig. 2). This slot is arranged across the sweep of the eccentric 19. A spring 68' coiled about the rod forces the rod normally endwise to constantly press the toe against the side of eccentric 19. When the eccentric is shifted relatively to the casing it shifts the toe 66 from one end of the slot to the other. When the toe is in one end of the slot the reversing sleeve 36 is shifted so that bevel gear 37 meshes with bevel gear 32 and when it is moved to the other end of the slot, gear 38 meshes with gear 32 for the reverse drive when toe 66 is midway of slot 67, sleeve 36 is midway, and neither gear 37 nor 38 is in mesh with bevel gear 32. In this last position, the power drive from the flexible shaft 23 is stopped. This is the neutral position, and the shaft 35 is idle. In order to permit manual calibration or adjustment of the map, or to permit it to be propelled by hand, a knurled wheel 68 is fast on shaft 35. This knurled wheel 68 is arranged to project slightly through a slot in the top of the casing. It will be noted that although the power drive is cut off in neutral position, the spools 9 and 10 may be driven by means of the ratchet drives and belt drives heretofore described.

As a convenient means of shifting the reverse, the arrangement of eccentric and casing is most useful. It will be noted that the eccentric 18 is part of the bracket 19 which is fast to the steering post of the automobile. But since the casing 1 is pivotally mounted on the stand 16, the casing may be swung into different positions. The shifting of the casing is thus utilized to shift the toe 66 in its slot 67 in the casing. It is evident that when the casing pivots, the toe 66 will be swept about the periphery of the eccentric 18 and the toe 66 moved a corresponding distance in its slot. The spring 68 assists this shifting of the toe in one direction. For the purpose of holding the casing in its shifted position, the eccentric is formed with a spring detent 70 which resiliently wedges into spaced notches 71, 72 and 73, representing the forward neutral and reverse drives of the reversing sleeve 36.

The map is designed to provide any desired warning to the operator of the machine. For instance, in the adaptation of the invention to an automobile, if the automobile is approaching a dangerous turn or railroad crossing it is deemed expedient to operate a warning signal, in the present instance, a light located within the casing. To this end, the map is provided with desired signal operating slots 75 located on the map in advance of the disposition of the corresponding turn or crossing so that the signal is operated well before the crossing or turn is reached. And inasmuch as the present map is adapted to be operated in forward and reverse directions, this slot 75 is disposed to straddle a corresponding indicia, that is, a portion of the slot lies well in advance on each side of the indicia. This is a novel arrangement and extremely desirable. For example, in Fig. 8, the map M is shown with an indicated street 76 which is designated as State Street lying exactly transverse to the central road line 77 on the map and the slot 75 is disposed with an ample portion thereof on each side of the line 76 which advance distance represents an actual travel of the vehicle of from fifty to one hundred yards or more, just as desired. This provides enough distance to enable the driver to slow down to prevent accidents. The warning slot 75 operates prematurely in either direction of travel of the map.

The warning slot 75 in the map is brought over a contact spring 78 mounted on a bracket 79 within the casing and is suitably insulated therefrom. This bracket also carries a light 80 electrically in circuit with the spring 78 and a second spring 81 carried by the casing top 2. When the slot 75 comes opposite the spring contacts 78 and 81, they spring together and establish the lighting circuit. Manifestly, any number of lights of variant colors may be so provided and so also, other arrangements of slots 75 are contemplated. Two spaced spring fingers 83 bear on the inner periphery 84 of the sprockets 39 and 40 to kerf the map onto the sprockets.

A further novel and highly advantageous feature of the map in connection with the map operating mechanism resides in the disposition of the guiding or route indicia thereon and particularly the printed words corresponding to such indicia. For instance, it will be noted that the words State Street so arranged with the letters moving parallel with the road line 77, all other words relating to indicia or advertising are so arranged on the map. By this disposition the words are quickly read in both directions of travel of the map and particularly when the map casing is in horizontal or neutral position as indicated in Fig. 3.

One of the most valuable and practical features of the present invention resides in the arrangement of the map indicia together with the reversible feature of the map so that irrespective of the direction of travel of the vehicle, for instance, if it be an automobile travelling along a road, the indicia on the map corresponding to landmarks on or along the road will always be on the proper side. For instance, in Fig. 8, a church 85 is designated as located a predetermined distance away from the right side of the road when the automobile is travelling along the road in a direction toward the top of the sheet and inasmuch as the driving gearing is arranged as to always propel the map toward the driver, the symbols on the map will approach him just as do the landmarks on the road or roadside. In other words, in Fig. 4, the travel of the map will be towards the bottom of the sheet. This is indicated by the arrow 87 in Fig. 5, in which figure the car is illustrated as travelling along the road in the direction of arrow 88. In this position, the church 89 at the right of the road is illustrated on the map M at 85 and is on the right of the central road line 77 of the map. Now, suppose the automobile is travelling along this same road in the opposite direction as in Fig. 6. In this instance, the direction of travel is still indicated by the arrow 88, but reversely to that of Fig. 5. If the direction of the automobile be reversed, the direction of travel of the map must also be reversed to run the map backwards or in other words, to retrace the route. This reversed direction of the map propulsion is indicated in Fig. 6 by the arrow 87. But it will be noticed that in the reversed position of the automobile and the reversed direction of propulsion of the map, the church symbol 85 on the map is not on the correct side of the map. It should be on the same side of the map as the actual church is on the side of the road. If not, the symbols on the map and on the roadside will be changed left for right which is very confusing to the driver. This difficulty is corrected by the provision of the means for turning the map casing 1, end for end, with relation to its bracket 19. Such correct position is illustrated in Fig. 7, when the symbol 85 is on the side of the map adjacent the church side of the road and the automobile is travelling in the direction indicated by the arrow 88 and the map is being propelled toward the driver or in the direction of the arrow 87.

Thus by the above simple construction and arrangement, if an autoist starts from New York to go to Providence, he installs a New York to Boston map on his machine. After he has traversed say fifty miles on his route, he decides to return to New York. He turns his automobile around, reverses the casing of the road map and is ready for the return trip. The map remains unchanged in the machine, the driver does not have to remove it from the machine, turn it over, or take out the spools or reset it. He simply turns the casing one hundred and eighty degrees on its bracket, which shifting movement automatically reverses the map drive. In case the operator wishes to adjust or calibrate the map to make a street crossing come exactly under the hair line of the glass window, he simply shifts the casing ninety degrees to horizontal position, where it is plainly read, and in which position, the power drive is automatically disconnected so that he can turn either spool according to the direction he turns the knurled wheel 68 projecting slightly above the casing.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. A route indicator for propelled vehicles comprising a casing, two map spools mounted in spaced relation therein and adapted to receive a map strip running from one spool to the other, an intermediate shaft arranged parallel with said spools, a pair of reversely arranged gears slidable on said shaft, a power gear between said reverse gears, said power gear being driven in synchronism with the travel of the vehicle, means to shift said reversely arranged gears to change the driving relation, a pulley loose on each end of said intermediate shaft, an overrunning clutch adapted to drive one of said pulleys clockwise only, a second overrunning clutch adapted to drive the other pulley counter-clockwise only, a friction drive between each pulley and one of said spools, a sprocket fast on said intermediate shaft, said sprocket being adapted to engage in perforated holes in the map strip to control the rate of feed of said map due to the rotation of a spool.

2. A route indicator for propelled vehicles comprising a casing, spaced map spools journaled therein, an intermediate shaft, power means to drive continuously said shaft in reverse directions at will, means operated by said shaft to rotate one of said spools in one direction only, and means operated by said shaft for rotating the other spool in the opposite direction only, means to disconnect said power means, and means for manually rotating said shaft to rotate one or the other spool according to the direction of rotation.

3. A route indicator for propelled vehicles comprising a casing, spaced map spools journaled therein and adapted to receive a map running from one spool to the other, a worm projecting upwardly from the bottom of the case, means for driving said worm in synchronism with the travel of the vehicle, a horizontally disposed worm gear meshing with said worm, a second worm rotating with said worm gear, a substantially large horizontally arranged worm gear meshing with said second worm, a horizontally disposed bevel gear rotating with said large worm gear, an intermediate shaft disposed above said bevel gear and arranged parallel with said spools, reversely disposed bevel gears splined on said shaft and located on each side of said horizontal bevel gear, means for shifting said gears to bring one or the other into mesh, a pair of sprocket wheels on said shaft, one on each side adapted to engage perforations in the map strip, friction pulleys loose on said shaft, one at each end, reversely arranged overrunning clutches adapted to drive said friction pulleys in opposite directions, and a driving band frictionally connecting each of said pulleys to a map spool.

4. A route indicator for propelled vehicles comprising a bracket having an eccentric portion, a casing pivoted on said bracket, a map in said casing, means including a pair of reversing gears for reversing the direction of travel of said map, a gear shift lever connected with said gears and projecting into the path of said eccentric portion and constructed and arranged to be shifted when said casing is swung on its pivot.

5. An automobile road map comprising a casing, a map having a series of perforations, two map spools mounted in said casing in spaced relation, a driving shaft rotated in synchronism with the travel of the automobile, a driven shaft arranged between the spools and provided with means adapted to engage the perforations of said map, means to couple said driving and driven shafts for movement in reverse directions, and means for driving each spool from said driven shaft, said means being constructed and arranged to rotate one only of said spools on rotation of said driven shaft in one direction and only the other spool on rotation of said driven shaft in the reverse direction.

In testimony whereof, I affix my signature.

RALPH M. WEEKS.